US010440770B2

(12) United States Patent
Ohlsson et al.

(10) Patent No.: US 10,440,770 B2
(45) Date of Patent: Oct. 8, 2019

(54) NETWORK NODE AND METHOD FOR AVOIDING DROP OF A CONNECTION DUE TO RTP TIMEOUT (71) Applicant: Telefonaktiebolaget LM Ericsson (publ), Stockholm (SE)

(72) Inventors: Anders Ohlsson, Järfälla (SE); Christer Gustafsson, Huddinge (SE); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/763,082

(22) PCT Filed: Sep. 23, 2015

(86) PCT No.: PCT/SE2015/050988
§ 371 (c)(1),
(2) Date: Mar. 23, 2018

(87) PCT Pub. No.: WO2017/052428
PCT Pub. Date: Mar. 30, 2017

(65) Prior Publication Data
US 2018/0279402 A1   Sep. 27, 2018

(51) Int. Cl.
*G01R 31/08* (2006.01)
*H04W 76/19* (2018.01)
(Continued)

(52) U.S. Cl.
CPC .......... *H04W 76/19* (2018.02); *H04L 65/608* (2013.01); *H04W 24/04* (2013.01); *H04W 76/25* (2018.02)

(58) Field of Classification Search
CPC .................................................... H04W 76/19
See application file for complete search history.

(56) References Cited

U.S. PATENT DOCUMENTS

| 6,618,357 B1* | 9/2003 | Geyer ..................... H04L 29/06 370/236 |
| 2008/0228936 A1* | 9/2008 | Schmid .................. H04H 20/82 709/232 |

(Continued)

FOREIGN PATENT DOCUMENTS

WO   2009026738 A1   3/2009

OTHER PUBLICATIONS

International Search Report and Written Opinion for International Application No. PCT/SE2015/050988, dated May 19, 2016, 14 pages.

(Continued)

*Primary Examiner* — Gerald A Smarth
(74) *Attorney, Agent, or Firm* — NDWE LLP (57) ABSTRACT A method performed by a network node for preventing a release of a connection from a User Equipment (UE) to the network node, which connection uses a Real Time Protocol (RTP) for media transfer. The network node operates in a wireless communication network and serves the UE. The network node detects a gap in a packet flow of the connection. When the network node has detected the gap in the packet flow, the network node prevents the UE from initiating a release of the connection caused by the gap in the packet flow, by sending a message to the UE, which message forces the UE into a failure. The failure triggers the UE to initiate a Radio Resource Control (RRC) Connection Reestablishment procedure.

19 Claims, 4 Drawing Sheets (51) Int. Cl.
*H04W 76/25* (2018.01)
*H04L 29/06* (2006.01)
*H04W 24/04* (2009.01)

(56) References Cited

U.S. PATENT DOCUMENTS

2011/0096671 A1    4/2011  Lindstrom et al.
2013/0329551 A1*  12/2013  Brisebois .............. H04W 76/27
                                                   370/230
2016/0219644 A1*   7/2016  Zhao ..................... H04W 76/12

OTHER PUBLICATIONS

3GPP TS 36.323, "3rd Generation Partnership Project; Technical Specification Group Radio Access Network; Evolved Universal Terrestrial Radio Access (E-UTRA); Packet Data Convergence Protocol (PDCP) specification (Release 11)," Mar. 2013, 27 pages, V11.2.0, 3GPP Organizational Partners.

3GPP TS 36.323, "3rd Generation Partnership Project; Technical Specification Group Radio Access Network; Evolved Universal Terrestrial Radio Access (E-UTRA); Packet Data Convergence Protocol (PDCP) specification (Release 12)," Jun. 2015, 33 pages, V12.4.0, 3GPP Organizational Partners.

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 12)," Mar. 2014, 356 pages, V12.1.0, 3GPP Organizational Partners.

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 12)," Jun. 2015, 449 pages, V12.6.0, 3GPP Organizational Partners.

3GPP TS 36.304, "3rd Generation Partnership Project; Technical Specification Group Radio Access Network; Evolved Universal Terrestrial Radio Access (E-UTRA); User Equipment (UE) procedures in idle mode (Release 11)," Sep. 2013, 34 pages, V11.5.0, 3GPP Organizational Partners.

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 12)," Dec. 2013, 349 pages, V12.0.0, 3GPP Organizational Partners.

International Preliminary Report on Patentability for Application No. PCT/SE2015/050988, dated Apr. 5, 2018, 9 pages.

\* cited by examiner

NETWORK NODE AND METHOD FOR AVOIDING DROP OF A CONNECTION DUE TO RTP TIMEOUT

CROSS-REFERENCE TO RELATED APPLICATIONS

This application is a National stage of International Application No. PCT/SE2015/050988, filed Sep. 23, 2015, which is hereby incorporated by reference.

TECHNICAL FIELD

Embodiments herein relate to a network node and a method therein. In particular, they relate to a method for avoiding a UE initiated release of a connection due to RTP timeout.

BACKGROUND

Communication devices such as User Equipment (UE) are enabled to communicate wirelessly in a cellular communications network or wireless communication system, sometimes also referred to as a cellular radio system or cellular network. The communication may be performed e.g. between two UEs, between a UE and a regular telephone and/or between a UE and a server via a Radio Access Network (RAN) and possibly one or more core networks, comprised within the cellular communications network.

UEs may further be referred to as wireless terminals, mobile terminals and/or mobile stations, mobile telephones, cellular telephones, laptops, tablet computers or surf plates with wireless capability, just to mention some further examples. The UEs in the present context may be, for example, portable, pocket-storable, hand-held, computer-comprised, or vehicle-mounted mobile devices, enabled to communicate voice and/or data, via the RAN, with another entity, such as another wireless terminal or a server.

The cellular communications network covers a geographical area which is divided into cell areas, wherein each cell area is being served by a network node. A cell is the geographical area where radio coverage is provided by the network node.

The network node may further control several transmission points, e.g. having Radio Units (RRUs). A cell may thus comprise one or more network nodes each controlling one or more transmission/reception points. A transmission point, also referred to as a transmission/reception point, is an entity that transmits and/or receives radio signals. The entity has a position in space, e.g. an antenna. A network node is an entity that controls one or more transmission points. The network node may e.g. be a base station such as a Radio Base Station (RBS), eNB, eNodeB, NodeB, B node, or Base Transceiver Station (BTS), depending on the technology and terminology used. The network nodes may be of different classes such as e.g. macro eNodeB, home eNodeB or pico base station, based on transmission power and thereby also cell size.

Further, each network node may support one or several communication technologies. The network nodes communicate over the air interface operating on radio frequencies with the UEs within range of the network node. In the context of this disclosure, the expression Downlink (DL) is used for the transmission path from the base station to the mobile station. The expression Uplink (UL) is used for the transmission path in the opposite direction i.e. from the UE to the base station.

Long Term Evolution (LTE) is a radio access technology standardized by the 3rd Generation Partnership Project (3GPP). In LTE, network nodes, which may be referred to as eNodeBs or even eNBs, may be directly connected to one or more core networks. In LTE the cellular communication network is also referred to as E-UTRAN. The standard is based on Orthogonal Frequency-Division Multiplexing (OFDM) in the downlink and Single Carrier-Frequency Division Multiple Access (SC-FDMA) in the uplink.

An E-UTRAN cell is defined by certain signals which are broadcasted from the network node. These signals contain information about the cell which can be used by UEs in order to connect to the network through the cell. The signals comprise reference and synchronization signals which the UE uses to find frame timing and physical cell identification as well as system information which comprises parameters relevant for the whole cell.

A UE trying to connect to the wireless network must thus first detect a suitable cell, as defined in 3GPP TS 36.304 v11.5.0. The UE may be in either idle state, which is also referred to as IDLE or RRC_IDLE, or in connected state, which state is also referred to as CONNECTED or RRC_CONNECTED. When the UE is in RRC_IDLE, it monitors a paging channel, which paging channel is part of a Paging Control Channel (PCCH) at a logical level, a Paging Channel (PCH) on a transport channel level and a Physical Downlink Shared Channel (PDSCH) on a physical channel level. While doing so it typically also performs a number of radio measurements which it uses to evaluate the best cell, such as Reference Signal Receive Power (RSRP), Reference Symbol Received Quality (RSRQ) or Received Signal Strength Indicator (RSSI). This is performed by measuring on received reference signals and/or parts of a spectrum which comprises reference signals sent by cells. This may also be referred to as "listening" for a suitable cell.

A suitable cell is commonly a cell which has RSRQ or RSRP above a certain level. The cell with the highest RSRP or RSRQ may be referred to as the best cell or the best suitable cell. Listening for a suitable cell may comprise searching for reference signals transmitted from the network node in an OFDM subframe. When the best suitable cell is found the UE performs random access, according to a system information for the cell. This is done in order to transmit a Radio Resource Control (RRC) connection setup request to the network node. Assuming the random access procedure succeeds and the network node receives the request, the network node will either answer with an RRC connection setup message, which acknowledges the UEs request and tells it to move into RRC connected state, or an RRC connection reject, which tells the UE that it may not connect to the cell. In RRC connected state the parameters necessary for communication between the network node and the UE are known to both entities and a data transfer between the two entities is enabled.

In LTE all packets are delivered using the IP protocol. This means that also traditionally circuit switched services such as conversational voice will make use of fast scheduling and will be served using Voice over IP (VoIP). In a typical VoIP arrangement a voice encoder on the transmitter side encodes the speech into voice packets, each with the typical speech duration of 20 ms, as mandated by GSMA IR.92. VoIP may for LTE networks also be referred to as Voice over LTE (VoLTE). VoLTE enables LTE networks to provide voice services.

The mouth-to-ear delay introduced by the transport scheduling and transmission of the VoLTE packets is one of the main factors when determining the experienced speech quality. This causes a relatively tight delay budget for VoLTE to ensure good speech quality. The normal delay budget in the eNB is 80 ms. Up to the limit of the delay budget the speech quality is good, which means that in general it is sufficient to schedule a VoLTE user once every 40 ms hence bundling two packets. Such a scheduling method allows for a good balance between efficient usages of resources, good speech quality and enhanced battery performance. The VoLTE service uses a Real-time Transport Protocol (RTP) or a Secure Real-time Transport Protocol (SRTP) to transport voice data between the clients. Hereinafter, if not else mentioned the embodiments discussed for RTP shall be equally applicable to SRTP.

RTP provides end-to-end network transport functions suitable for applications transmitting real-time data, such as audio, video or simulation data, over multicast or unicast network services. RTP does not address resource reservation and does not guarantee quality-of-service for real-time services. The data transport is augmented by a Real-time Transport Control Protocol (RTCP) to allow monitoring of the data delivery in a manner scalable to large multicast networks, and to provide minimal control and identification functionality. RTP and RTCP are designed to be independent of the underlying transport and network layers. The protocol supports the use of RTP-level translators and mixers.

The VoLTE clients monitor the RTP packet flow in order to detect gaps. If the RTP gap is long enough, usually 10 seconds, the VoLTE client will initiate a call release and set a release cause to "RTP Timeout". Thereby the VoLTE call will be dropped.

In order to re-establish the RRC connection after a failure in operation, the UE may perform a RRC Connection Reestablishment procedure, which involves the resumption of operation on a Signalling Radio Bearer 1 (SRB1), which is used to transfer RRC messages in the Downlink Control CHannel (DCCH), and the re-activation of security.

A UE in RRC_CONNECTED mode, for which Access Stratum (AS) security has been activated, may initiate the RRC Connection Reestablishment procedure in order to continue the RRC connection. The connection re-establishment succeeds only if the concerned cell is prepared i.e. has a valid UE context. In case E-UTRAN accepts the re-establishment, SRB1 operation resumes while the operation of other radio bearers remains suspended. When AS security has not been activated, the UE moves directly to RRC_IDLE instead of initiating the procedure. The purpose of AS security is to securely deliver RRC messages between a UE and a network node in the control plane and IP packets in the user plane using AS security keys. The AS security keys are derived from a network node key and new keys are generated every time a new radio link is established, such as when RRC state moves from idle to connected. After the AS security setup is completed, the UE and the network node get to share an RRC integrity key, an RRC encryption key and a user plane encryption key. Encryption and integrity protection using these keys are performed at a Packet Data Convergence Protocol (PDCP) layer. The RRC integrity key and the RRC encryption key are used to securely deliver RRC messages in the control plane through a Signaling Radio Bearer (SRB) over radio links. The RRC messages are integrity protected using the RRC integrity key and encrypted using the RRC encryption key at the PDCP layer before being sent. The user plane encryption key is used to securely deliver IP packets in the user plane through a Data Radio Bearer (DRB) over radio links. The IP packets are encrypted using the user plane encryption key at the PDCP layer before being sent.

The PDCP layer exists in the UE and network node and is a part of LTE air interface control and user planes. The PDCP sublayer provides several services and functions both on the control plane and on the user plane. The main services and functions of the PDCP sublayer for the user plane include:
  Header compression and decompression: This only applies for RObust Header Compression (ROHC);
  Transfer of user data;
  In-sequence delivery of upper layer Protocol Data Units (PDUs) at PDCP re-establishment procedure for Radio Link Control Acknowledge Mode (RLC AM);
  Duplicate detection of lower layer Service Data Units (SDUs) at PDCP re-establishment procedure for RLC AM;
  Retransmission of PDCP SDUs at handover for RLC AM;
  Ciphering and deciphering;
  Timer-based SDU discard in uplink.
The main services and functions of the PDCP for the control plane include:
  Ciphering
  Integrity Protection;
  Transfer of control plane data.

One of the biggest problems with VoLTE in live networks today is call drop. Call drop for VoLTE is always affecting the end-user. There is a big difference having a drop in a mobile broadband UE. The Mobile Broadband UE is often active even though the end-user might not have initiated the activity. Examples of such activities may be push mail, facebook updates, etc.

However, this is not the case for VoLTE. As soon as a VoLTE call has been initiated there is always an end-user expecting to get a good voice service, without interruptions.

A VoLTE UE may drop due to many reasons; however one of the most common is an RTP-Timeout, where the uplink or downlink RTP flow has stopped for some reason, creating an RTP gap.

The reasons for the RTP gaps may be many and might also be caused by the EPC core network, IMS, transport or RAN.

Usually the RTP gaps are caused by poor conditions in the RAN. The weakest link in the communication with the UE is the UL. In UL the UEs output power is usually the limiting factor, giving that very often it is the UL failing during a UE-eNB communication. The failed communication might be caused by high UL interference, high path loss, high load or other radio related reasons, like fading, etc.

The VoLTE service is using RLC Unacknowledge Mode (UM) to transfer the voice and silence data, which does not have delivery guaranteed as RLC Acknowledge mode (AM) has. In this scenario the RTP client in the receiving end, such as e.g. the UE, will detect the RTP gap in the DL and normally after about 10 seconds (depending on configuration) it will initiate a release of the call with the release cause "RTP-Timeout" and the call will be dropped.

SUMMARY

It is therefore an object of embodiments herein to reduce the number of dropped VoIP calls.

According to a first aspect of embodiments herein, the object is achieved by a method performed by a network node for preventing a release of a connection from a UE to the network node, which connection uses a Real Time Protocol, RTP, for media transfer. The network node operates in a wireless communication network and serves a User Equipment, UE. The network node detects a gap in a packet-flow of the connection. When the network node has detected a gap in the packet-flow, the network node prevents the UE from initiating a release of the connection caused by the gap in the packet flow, by sending a message to the UE, which message forces the UE into a failure. The failure triggers the UE to initiate a Radio Resource Control, RRC, Connection Reestablishment procedure.

According to a second aspect of embodiments herein, the object is achieved by a network node for performing a method for preventing a release of a connection from a UE to the network node, which connection uses a Real Time Protocol, RTP, for media transfer. The network node operates in a wireless communications network and serves a UE. The network node is configured to detect a gap in a packet flow of the connection. When a gap in the packet-flow is detected, the network node is further configured to prevent the UE from initiating a release of the connection caused by the gap in the packet flow, by sending a message to the UE, which message forces the UE into a failure. The failure triggers the UE to initiate a Radio Resource Control, RRC, Connection Reestablishment procedure.

By forcing the UE into a failure which triggers the UE to initiate a RRC Connection Reestablishment procedure, a release of the VoLTE call due to RTP timeout is avoided by giving the UE an opportunity to reestablish the connection. This increases the probability of the call being maintained, which reduces the number of dropped VoLTE calls. Thereby the end-user satisfaction is increased since an improved VoLTE service is experienced.

ABBREVIATIONS

AS Access Stratum
UE User Equipment
RLC Radio Link Control
RTP Real Time Protocol
RRC Radio Resource Control
PDCP Packet Data Convergence Protocol
PDU Protocol Data Unit
SDU Service Data Unit
VoLTE Voice over LTE

BRIEF DESCRIPTION OF THE DRAWINGS

Examples of embodiments herein are described in more detail with reference to attached drawings in which.

DETAILED DESCRIPTION

Embodiments herein relate to a method and a network node in a 3GPP wireless network.

Since RLC UM does not have delivery guaranteed the RLC UM will not know if the UL transmissions for VoLTE are ever received by the receiver, hence RLC UM will not indicate to upper layers that something is wrong e.g. if all the UL transmissions of voice data are lost over the air interface.

The embodiments described herein relate to detecting a RTP gap in the UL and making the UE 120 initiate an RRC Connection Reestablishment procedure, when the network node 110, such as e.g. an eNB, is detecting a long RTP gap in the UL. This is done in order to try to save the VoLTE call from being disconnected by the RTP client, such as e.g. an UE 120, due to RTP timeout and by that releasing, which may also be referred to as dropping, the call.

Figure 1:
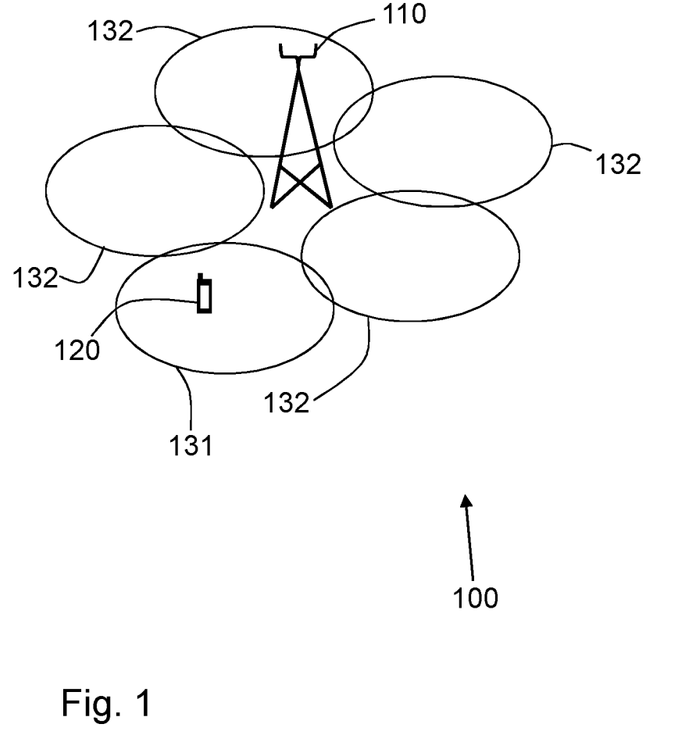
FIG. 1 is a schematic diagram illustrating embodiments of a wireless communications network.

FIG. 1 depicts an example of a wireless communications network 100 according to a first scenario in which embodiments herein may be implemented. The wireless communications network 100 is a wireless communication network such as an LTE, E-Utran, any 3GPP cellular network, Wmax, or any cellular network or system applying OFDM-signaling.

The wireless communications network 100 comprises a plurality of network nodes whereof one network node 110 is depicted in FIG. 1. The network node 110 may be a transmission point such as a radio base station, for example an eNB, an eNodeB, or an Home Node B, an Home eNode B or any other network node capable to serve a wireless terminal such as UE or a machine type communication device in a wireless communications network. The network node 110 serves a plurality of cells, such as a first cell 131 and one or more second cells 132.

A UE 120 operates in the wireless communications network 100. The network node 110 may be a transmission point for the UE 120. The UE 120 is within radio range of the first cell 131 and the one or more second cells 132, this means that it can hear signals from the first cell 131 and the one or more second cells 132.

The UE 120 may e.g. be a wireless terminal, a wireless device, a mobile wireless terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in a wireless communications network. Please note the term wireless terminal used in this document also covers other wireless devices such as Machine to Machine (M2M) devices.

Figure 2:
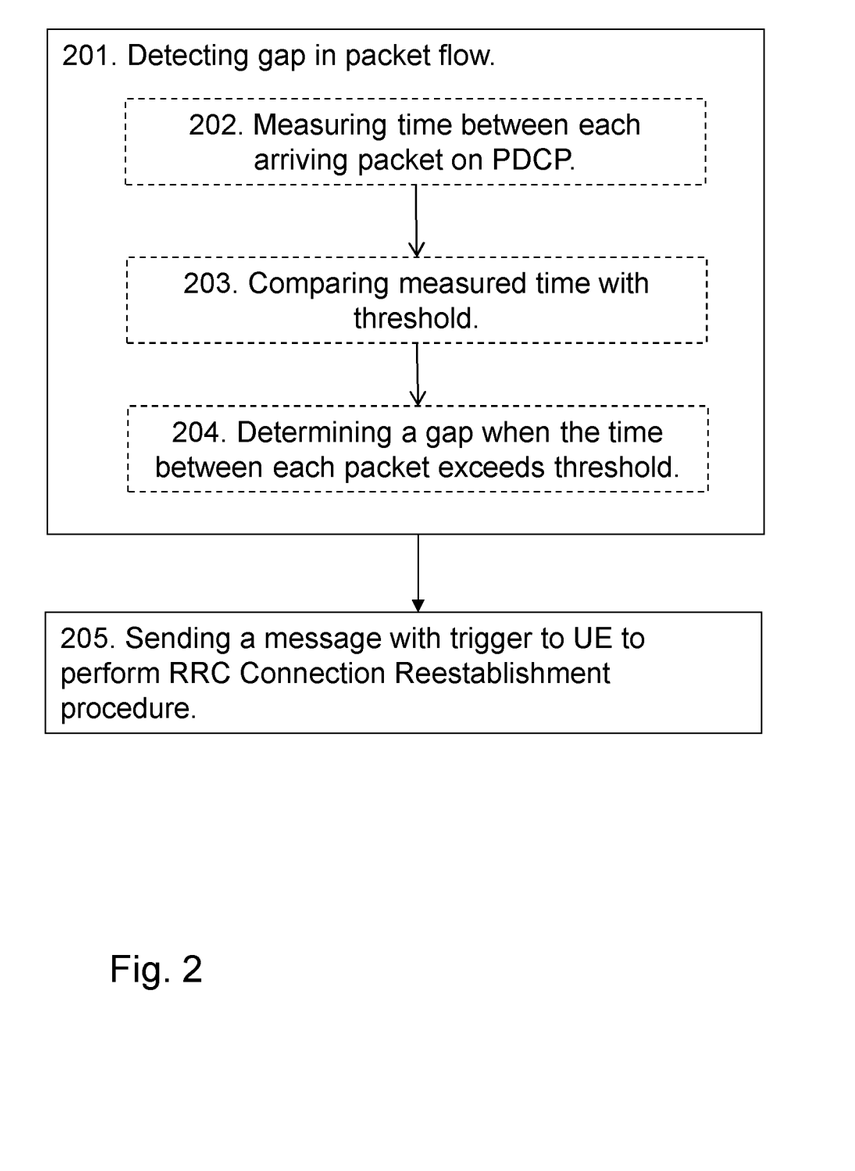
FIG. 2 is a flowchart depicting embodiments of a method in a network node.

Example of embodiments of a method performed by the network node 110, such as e.g. an eNB, for preventing a release of a connection from a UE 120 to the network node 110, which connection uses a Real Time Protocol, RTP, for media transfer will now be described with reference to a flowchart depicted in FIG. 2.

The method comprises the following actions, which actions may be taken in any suitable order. Dashed lines of a box in FIG. 2 indicate that this action is performed in only some embodiments and is not mandatory.

Action 201

In order to prevent the UE 120 from dropping the VoIP call, such as a VoLTE call, due to a timeout in the packet flow in the UL, the network node 110 is e.g. required to detect a gap in the packet flow of the connection. The gap in the packet flow may be detected by monitoring the packet flow, such as an RTP-flow, an SRTP-flow and/or an RTCP-flow. A VoLTE service generates packets, such as e.g. RTP and/or SRTP packets, for Voice and/or Silence in a certain pattern. In current LTE-systems packets may be created every 20 ms during Voice and every 160 ms during Silence (SID).

The detecting of the gap in the packet flow may be performed according to the following actions 202 to 204.

Action 202

The network node 110 may monitor the packet flow in the UL by measuring a time between each arriving packet on a PDCP level.

Action 203

When the network node 110 has measured the time between two arriving packets it may compare the measured time with a threshold. The threshold is configured such that it is lower than the gap time for which the UE 120 initiates the release of the connection and allows the network node 110 to send a message to the UE 120 before the UE 120 initiates the release of connection. In some embodiments the threshold may e.g. be configured to be at least one second lower than the gap time for which the UE 120 initiates the release of the connection. For a UE 120 which is configured to release the connection after a gap in the RTP flow of 10 seconds, the threshold may e.g. be configured to be in the range of 5 to 9 seconds. In a further embodiment the threshold may be configured to be 9 seconds.

Action 204

The network node 110 may determine that there is a gap in the packet flow when the time between two arriving packets exceeds the threshold.

Action 205

When the network node 110 has detected a gap in the packet-flow, the network node 110 prevents the UE 120 from initiating a release of the connection to the network node 110 caused by the gap in the packet flow, by sending a message to the UE 120, which message forces the UE 120 into a failure. The failure triggers the UE 120 to initiate a Radio Resource Control, RRC, Connection Reestablishment procedure. The network node 110 may trigger the RRC Connection Reestablishment procedure by forcing the UE 120 to declare a failure and initiate the RRC Connection Reestablishment procedure. The RRC Connection Reestablishment procedure is disclosed in FIG. 3. When the UE 120 has declared 301 a failure, the UE 120 will send 302 a RRC Connection Reestablishment Request to the network node 110 comprising the cause of the failure. When the network node 110 is prepared for the RRC Connection Reestablishment Request, i.e. has a valid UE 120 context, the network node 110 will send 303 a RRC Connection Reestablishment message to the UE 120 which will reestablish the connection according to a configuration received in the RRC Connection Reestablishment message. The UE 120 will then send 304 a RRC Connection Reestablishment Complete message to the network node 110, which indicates to the network node 110 that the connection is reestablished and that the network node 110 may resume transmission of messages on SRB1 again. During the RRC Connection Reestablishment procedure, the upper layers of an LTE Protocol Stack will hold the connection, while the lower layers will search for a better cell.

Figure 3:
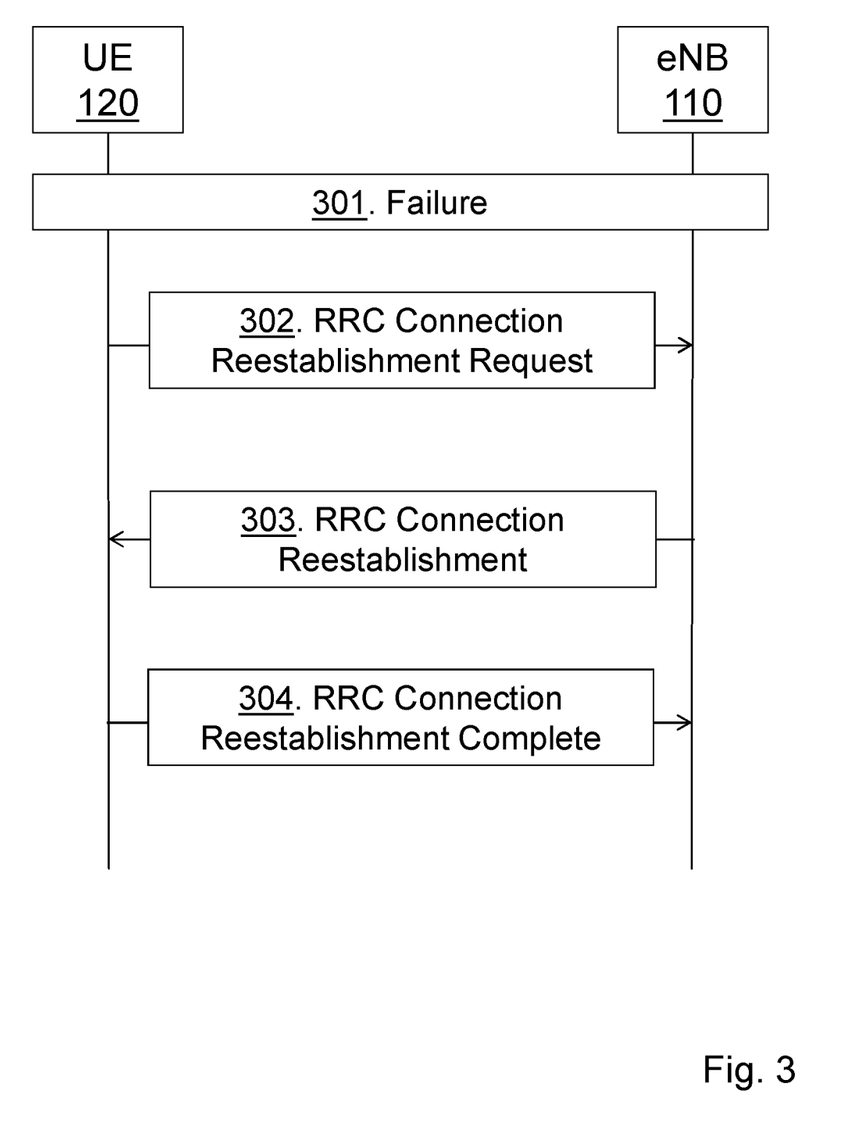
FIG. 3 is a flowchart illustrating an RRC Connection Reestablishment procedure.

The network node 110 may trigger a radio link failure in the UE 120 by sending a corrupt message to the UE 120. The corrupt message may e.g. be a "dummy" RRC message on SRB1 in which the network node 110 has applied a fault integrity protection algorithm. The fault integrity protection algorithm may be configured in such a way that when the UE 120 performs the integrity check the algorithm will produce a result which is not plausible, which may also be referred to as being faulty, and hence will lead to the UE 120 reporting an error. The faulty integrity check in the RRC message forces the UE 120 into an integrity verification failure. The conditions for which the UE 120 shall trigger a RRC Connection Reestablishment procedure are specified in 3GPP TS 36.331 V12.0.0. The UE 120 only initiates the procedure when AS security has been activated. The UE 120 initiates the procedure upon integrity check failure indication from lower layers. The integrity check is performed by the UE 120 in PDCP layer, the procedure for SRBs is specified in 3GPP TS36.323 V11.2.0 for PDCP. For SRBs, at a reception of a PDCP Data Protocol Data Unit (PDU) from lower layers, the UE 120 shall decipher and verify the integrity of the PDU. If the integrity verification fails, the UE 120 discards the received PDCP Data PDU and indicates the integrity verification failure to an upper layer.

When the UE 120 receives the "dummy" RRC message, which may be any RRC Connection reconfiguration message with a faulty integrity check, the PDCP layer in the UE 120 will indicate Integrity Verification Failure to upper layers, in this case RRC. RRC will then initiate the RRC Connection Reestablishment procedure.

In a further embodiment herein, the network node 110 may prevent the UE 120 from initiating a release of the connection by sending a message to the UE 120, which message forces the UE 120 into a radio link failure. The network node 110 may force the UE 120 into the radio link failure by avoiding sending Radio Link Control, RLC, Status Protocol Data Units, PDUs, in the DownLink, DL message. By not sending RLC Status PDUs in the message the UE 120 will try to resend a request to the network node 110 until a maximum number of retransmissions from RLC are reached. In a further embodiment the network node 110 may force the UE 120 into the radio link failure by avoiding sending a Random Access Message 2 (RaMsg2) to the UE 120. By not sending the RaMsg2 to the UE 120, the network node 110 creates the radio link failure in the UE 120 by preventing Contention Based Radio Access (CBRA) and Contention Free Radio Access (CFRA) from succeeding.

In a further embodiment herein, the network node 110 prevents the UE 120 from initiating a release of the connection by sending a message to the UE 120, which message forces the UE 120 into a handover failure. The network node 110 forces the UE 120 into the handover failure by sending a message which triggers an Intra Cell handover and avoiding sending a Random Access Message 2 to the UE 120. By not sending the RaMsg2 during the Intra Cell handover, the network node 110 creates the handover failure in the UE 120 by preventing the CBRA or CFRA from succeeding.

In a further embodiment herein, the network node 110 prevents the UE 120 from initiating a release of the connection by sending a message to the UE 120, which message forces the UE 120 into a mobility from E-UTRA failure. The network node 110 forces the UE 120 into a mobility from E-UTRA failure by introducing a protocol error in an inter RAT information included in a MobilityFromEUTRACommand message in an RRC Connection Reconfiguration message.

In a further embodiment herein, the network node 110 prevents the UE 120 from initiating a release of the connection by sending a message to the UE 120, which message forces the UE 120 into a RRC connection reconfiguration failure. The network node 110 forces the UE 120 into the RRC connection reconfiguration failure by including a configuration in an RRC Connection Reconfiguration message, which the UE 120 is unable to comply with.

During the RRC Connection reestablishment procedure the UE 120 will perform a cell search and select the best cell to camp on and send the RRC Connection Reestablishment Request in the chosen cell.

By performing a successful RRC Connection Reestablishment the UE 120 is prevented from initiating a release of the connection which maintains the call using RTP, such as the VoIP or VoLTE call.

In order to prevent an unnecessary triggering of the RRC Connection Reestablishment procedure, the network node 110 may monitor both an RTP packet flow and an RTCP packet flow. If the network node 110 detects a gap in the RTP packet flow, but still receives RTCP packets, the network 110 does not send the message which forces the UE 120 into a failure. Thereby, an unnecessary triggering of the RRC Connection Reestablishment procedure is avoided in situations where a call is initiated but there is no transfer of information, such as for e.g. when a call is on hold and there is no RTP packet flow.

Figure 4:
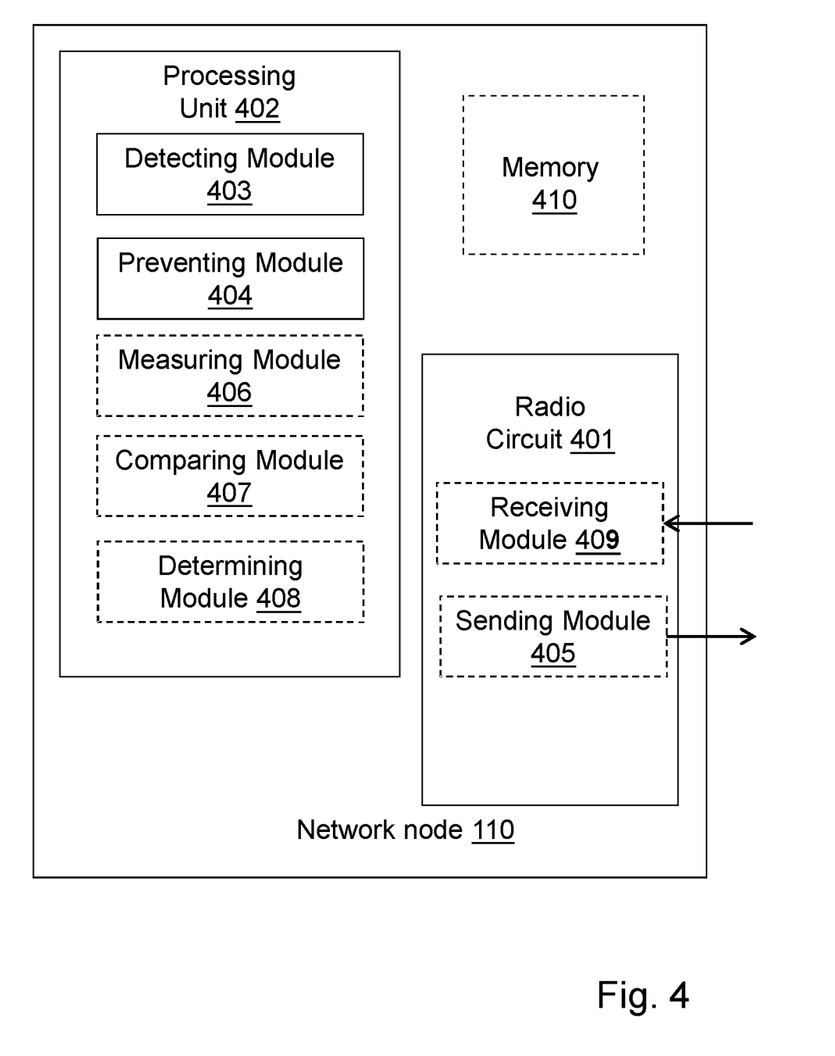
FIG. 4 is a schematic block diagram illustrating embodiments of a network node.

To perform the method actions for preventing a release of a connection from a UE 120 to the network node 110, which connection uses a Real Time Protocol, RTP, for media transfer described above in relation to FIG. 2, the network node 110 comprises the following arrangement depicted in FIG. 4. As mentioned above the network node 110 is configured to serve a UE 120. The network node 110 comprises a radio circuitry 401 for communicating with UEs 120 and a processing unit 402.

The network node 110 is configured to, e.g. by means of a detecting module 403 being configured to, detect a gap in a packet-flow of the connection. The detecting module 403 may be comprised in the processing unit 402.

The network node 110 is further configured to, e.g. by means of a preventing module 404 being configured to, prevent the UE 120 from initiating a release of the connection caused by the gap in the packet flow, by sending a message to the UE 120, which message forces the UE 120 into a failure, and which failure triggers the UE 120 to initiate a Radio Resource Control, RRC, Connection Reestablishment procedure. The preventing module 404 may be comprised in the processing unit 402.

The network node 110 may further be configured to, e.g. by means of a sending module 405 being configured to, send the message to the UE 120. The sending module 405 may be comprised in the radio circuitry 401.

The network node 110 may further be configured to, e.g. by means of a measuring module 406 being configured to, measure a time between each arriving packet on a PDCP level. The measuring module 406 may be comprised in the processing unit 402.

The network node 110 may further be configured to, e.g. by means of a comparing module 407 being configured to, compare the measured time between two arriving packets with a threshold. The comparing module 407 may be comprised in the processing unit 402.

The network node 110 may further be configured to, e.g. by means of a determining module 408 being configured to, determine that there is a gap in the packet flow when the time between two arriving packets exceeds the threshold. The determining module 407 may be comprised in the processing unit 402.

The network node 110 may be configured to, e.g. by means of the sending module 404 being configured to, trigger a radio link failure in the UE 120 by sending a corrupt message to the UE 120.

The network node 110 may further be configured to, e.g. by means of the preventing module 404 being configured to, apply a fault integrity protection algorithm to a "dummy" RRC message on SRB1 to create the corrupt message.

The network node 110 may further be configured to, e.g. by means of the preventing module 404 being configured to, configure the fault integrity protection algorithm in such a way that when the UE 120 performs the integrity check the algorithm will produce a result which is not plausible, which may also be referred to as being faulty, and hence will lead to the UE 120 reporting an error.

In a further embodiment herein, the network node 110 may be configured to, e.g. by means of the preventing module 404 being configured to prevent the UE 120 from initiating a release of the connection by sending a message to the UE 120, which message forces the UE 120 into a radio link failure. The network node 110 may further be configured to, e.g. by means of the preventing module 404 being configured to, force the UE 120 into the radio link failure by avoiding sending Radio Link Control, RLC, Status Protocol Data Units, PDUs, in the message sent in DL.

In a further embodiment the network node 110 may be configured to, e.g. by means of the preventing module 404 being configured to, force the UE 120 into the radio link failure by avoiding sending a Random Access Message 2 (RaMsg2) to the UE 120.

In a further embodiment herein, the network node 110 may be configured to, e.g. by means of the preventing module 404 being configured to, prevent the UE 120 from initiating a release of the connection by sending a message to the UE 120, which message forces the UE 120 into a handover failure. The network node 110 may be configured to, e.g. by means of the preventing module 404 being configured to, force the UE 120 into the handover failure by sending a message which triggers an Intra Cell handover and avoiding sending a Random Access Message 2 to the UE 120.

In a further embodiment herein, the network node 110 may be configured to, e.g. by means of the preventing module 404 being configured to, prevent the UE 120 from initiating a release of the connection by sending a message to the UE 120, which message forces the UE 120 into a mobility from E-UTRA failure. The network node 110 may be configured to, e.g. by means of the preventing module 404 being configured to, force the UE 120 into a mobility from E-UTRA failure by introducing a protocol error in an inter RAT information included in a MobilityFromEUTRACommand message in an RRC Connection Reconfiguration message.

In a further embodiment herein, the network node 110 may be configured to, e.g. by means of the preventing module 404 being configured to, prevent the UE 120 from initiating a release of the connection by sending a message to the UE 120, which message forces the UE 120 into a RRC connection reconfiguration failure. The network node 110 may be configured to, e.g. by means of the preventing module 404 being configured to, force the UE 120 into the RRC connection reconfiguration failure by including a configuration in an RRC Connection Reconfiguration message, which the UE 120 is unable to comply with.

The preventing unit 404 may send the message to the UE 120 via the sending module 405.

In further embodiments herein the network node 110 may be configured to, e.g. by means of a receiving module 409 being configured to, receive a RRC Connection Reestablishment Request, from the UE 120. The receiving module 409 may be comprised in the radio circuitry 401.

The embodiments herein for preventing a release of a connection from a UE 120 to the network node 110 may be implemented through one or more processors, such as the processing unit 402 in the network node 110 depicted in FIG. 4, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 410 comprising one or more memory units. The memory 410 is arranged to be used to store obtained information, measurements, data, configurations, schedulings, and applications to perform the methods herein when being executed in the network node 110.

Those skilled in the art will also appreciate that the detecting module 403, the preventing module 404, the sending module 405, the measuring module 406, the comparing module 407, the determining module 408 and the receiving module 409 described above may refer to a combination of analog and digital circuits, and/or one or more processors configured with software and/or firmware, e.g. stored in the memory 410, that when executed by the one or more processors such as the processing unit 402 as described above. One or more of these processors, as well as the other digital hardware, may be included in a single Application-Specific Integrated Circuit (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

When using the word "set" or "a set of" it shall be interpreted as meaning "one or more of".

The embodiments herein are not limited to the above described preferred embodiments. Various alternatives, modifications and equivalents may be used.

Therefore, the above embodiments should not be taken as limiting the scope of the invention, which is defined by the appending claims.

The invention claimed is:

1. A method performed by a network node for preventing a release of a connection from a User Equipment (UE) to the network node, which connection uses a Real Time Protocol (RTP) for media transfer, which network node operates in a wireless communication network and serves the UE, the method comprises:
   detecting a gap in a packet flow of the connection, wherein exceeding the gap in the packet flow results in the UE initiating the release of the connection; and
   preventing the UE from initiating the release of the connection caused by the gap in the packet flow, by sending a message to the UE when detecting the gap, in which the message forces the UE into a failure, and which failure triggers the UE to initiate a Radio Resource Control (RRC) Connection Reestablishment procedure to maintain the connection.

2. The method according to claim 1, wherein the detecting of the gap in the packet flow comprises:
   measuring a time between each arriving packet on a Packet Data Convergence Protocol (PDCP) level,
   comparing the measured time with a threshold,
   determining the gap when the time between each arriving packet exceeds the threshold.

3. The method according to claim 1, wherein the packet flow is at least one of a RTP-flow, a Secure Real Time Transport Protocol (SRTP)-flow and a Real Time Transport Control Protocol (RTCP)-flow.

4. The method according to claim 1, wherein the network node prevents the UE from initiating the release of the connection by sending the message to the UE, which message is a RRC message comprising a faulty integrity check which forces the UE into an integrity verification failure.

5. The method according to claim 1, wherein the network node prevents the UE from initiating the release of the connection by sending the message to the UE, which message forces the UE into a radio link failure.

6. The method according to claim 5, wherein the network node forces the UE into the radio link failure by avoiding sending Radio Link Control (RLC) Status Protocol Data Units (PDUs) in DownLink (DL).

7. The method according to claim 5, wherein the network node forces the UE into the radio link failure by avoiding sending a Random Access Message 2 to the UE.

8. The method according to claim 1, wherein the network node prevents the UE from initiating the release of the connection by sending the message to the UE, which message forces the UE into a handover failure by triggering an Intra Cell handover and avoiding sending a Random Access Message 2 to the UE.

9. The method according to claim 1, wherein the network node prevents the UE from initiating the release of the connection by sending the message to the UE, which message forces the UE into a mobility from Evolved Universal Terrestrial Radio Access (E-UTRA) failure by introducing a protocol error in an inter Radio Access Technology (RAT) information included in a MobilityFromEUTRACommand message in a RRC Connection Reconfiguration message.

10. The method according to claim 1, wherein the network node prevents the UE from initiating the release of the connection by sending the message to the UE, which message forces the UE into a RRC connection reconfiguration failure by including a configuration in a RRC Connection Reconfiguration message, which the UE is unable to comply with.

11. A network node for preventing a release of a connection from a User Equipment (UE) to the network node, which connection uses a Real Time Protocol (RTP) for media transfer, which network node operates in a wireless communication network and serves a UE wherein the network node comprises:
   a processor; and
   a memory containing program code which, when executed by the processor, instructs the network node to perform operations to:
      detect a gap in a packet flow of the connection, wherein exceeding the gap in the packet flow results in the UE initiating the release of the connection; and
      prevent the UE from initiating the release of the connection caused by the gap in the packet flow, by sending a message to the UE when detecting the gap, in which the message forces the UE into a failure, and which failure triggers the UE to initiate a Radio Resource Control (RRC) Connection Reestablishment procedure to maintain the connection.

12. The network node according to claim 11, wherein the program code which, when executed by the processor, instructs the network node to further perform operations to:
   measure a time between each arriving packet on a Packet Data Convergence Protocol (PDCP) level,
   compare the measured time with a predefined threshold,
   determine the gap when the time between each arriving packet exceeds the threshold.

13. The network node according to claim 11, wherein the program code which, when executed by the processor, instructs the network node to further perform operations to prevent the UE from initiating the release of the connection by sending the message to the UE, which message is a RRC message comprising a faulty integrity check, which forces the UE into an integrity verification failure.

14. The network node according to claim 11, wherein the program code which, when executed by the processor, instructs the network node to further perform operations to prevent the UE from initiating the release of the connection caused by the gap in the packet flow, by sending the message to the UE, which message forces the UE into a radio link failure.

15. The network node according to claim 14, wherein the program code which, when executed by the processor, instructs the network node to further perform operations to force the UE into the radio link failure by avoiding to send Radio Link Control (RLC) Status Protocol Data Units (PDUs) in DownLink (DL).

16. The network node according to claim 14, wherein the program code which, when executed by the processor, instructs the network node to further perform operations to force the UE into the radio link failure by avoiding sending a Random Access Message 2 to the UE.

17. The network node according to claim 11, wherein the program code which, when executed by the processor, instructs the network node to further perform operations to prevent the UE from initiating the release of the connection caused by the gap in the packet flow, by sending the message to the UE, which message forces the UE into a handover failure by triggering an Intra Cell handover and avoiding sending a Random Access Message 2 to the UE.

18. The network node according to claim 11, wherein the program code which, when executed by the processor, instructs the network node to further perform operations to prevent the UE from initiating the release of the connection caused by the gap in the packet flow, by sending the message to the UE, which message forces the UE into a mobility from Evolved Universal Terrestrial Radio Access (E-UTRA) failure by introducing a protocol error in an inter Radio Access Technology (RAT) information included in a MobilityFromEUTRACommand message in a RRC Connection Reconfiguration message.

19. The network node according to claim 11, wherein the program code which, when executed by the processor, instructs the network node to further perform operations to prevent the UE from initiating the release of the connection caused by the gap in the packet flow, by sending the message to the UE, which message forces the UE into a RRC connection reconfiguration failure by including a configuration in a RRC Connection Reconfiguration message, which the UE is unable to comply with.

* * * * *